United States Patent [19]

Stedman

[11] 4,165,137
[45] Aug. 21, 1979

[54] APEX TRACK SHOE AND METHOD FOR MAKING THE SAME

[75] Inventor: Robert N. Stedman, Chillicothe, Ill.

[73] Assignee: Caterpillar Tractor Co., Peoria, Ill.

[21] Appl. No.: 828,005

[22] Filed: Aug. 26, 1977

[51] Int. Cl.² .......................................... B62D 55/28
[52] U.S. Cl. ..................... 305/54; 228/152; 228/173 R
[58] Field of Search ............. 305/51, 53–55, 305/35 EB, 35 R, 39–50, 60; 301/44 T; 74/247; 152/180, 182, 187, 199; 228/173 R, 173 F, 170, 152

[56] References Cited
U.S. PATENT DOCUMENTS

| | | | |
|---|---|---|---|
| 2,964,361 | 12/1960 | Hansen | 305/53 X |
| 3,278,244 | 10/1966 | Deffenbaugh et al. | 305/54 |
| 3,937,529 | 2/1976 | Becker et al. | 305/54 |

FOREIGN PATENT DOCUMENTS 71879 11/1892 Fed. Rep. of Germany .......... 228/170

*Primary Examiner*—John P. Shannon
*Attorney, Agent, or Firm*—Phillips, Moore, Weissenberger, Lempio & Majestic

[57] ABSTRACT

A track shoe adapted for use in an endless track assembly for a track-type vehicle comprises a base having a pair of sidewalls formed integrally thereon. The sidewalls extend away from the base in converging relationship with respect to each other and terminate at edges which may be welded together. The method for making the track shoe comprises the steps of forming a blank to include the base and sidewalls of the track shoe, bending the sidewalls towards each other and then welding them together, if so desired.

17 Claims, 3 Drawing Figures

APEX TRACK SHOE AND METHOD FOR MAKING THE SAME

BACKGROUND OF THE INVENTION

Apex-type track shoes are oftentimes employed in the endless track assemblies of a track-type vehicle to increase the tractive capabilities of the vehicle, particularly when it is operated over "soft" soils. Conventional track shoes of this type, having a triangular cross section, normally comprise a separate base and a V-shaped track plate secured to the base by a pair of welds. The welds are subjected to severe loading during operation of the vehicle and thus must exhibit a high degree of structural integrity.

SUMMARY OF THIS INVENTION

The present invention is directed to overcoming one or more of the above problems as set forth above.

In one aspect of this invention, an improved track shoe comprises a base having a pair of sidewalls formed integrally thereon. The sidewalls terminate at adjacent edge portions which may be welded together and a lug is formed on each lateral side of the base to extend outwardly therefrom. In another aspect of this invention, the track shoe has a substantially uniform cross section and the edge portions of the sidewalls define a V-shaped groove having a weld deposited therein for securing the sidewalls together. In carrying forth the method for making the track shoe, a blank is first formed to comprise the base and sidewalls and the sidewalls are bent towards each other to form a hollow track shoe and may be welded together.

BRIEF DESCRIPTION OF THE DRAWING

Other objects of this invention will become apparent from the following description and accompanying drawing wherein.

DETAILED DESCRIPTION

Figure 1:
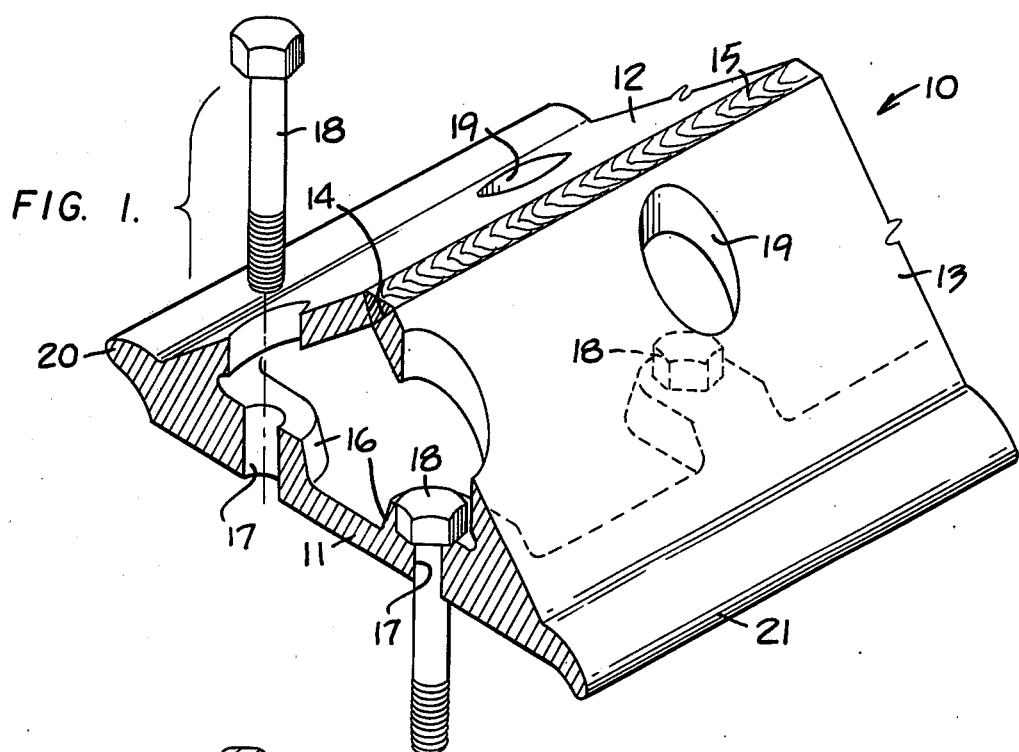
FIG. 1 is an isometric view partially illustrating a track shoe embodying this invention.

FIG. 1 partially illustrates a track shoe 10, having a triangular cross section, comprising a substantially flat base 11 having a pair of sidewalls 12 and 13 formed integrally with the base. The sidewalls extend away from the base and towards each other in converging relationship to terminate at closely adjacent end portions defining an apex portion of the track shoe. End edges of the sidewall define a V-shaped trough 14 therebetween, having a continuous weld 15 deposited therein to preferably secure the sidewalls together. Alternatively, the sidewalls could be maintained and utilized in unsecured relationship without the use of the weld or other suitable securing means.

A plurality of reinforcing bosses 16 are formed integrally on an interior surface of base 11 of the track shoe and a bore 17 is formed through each of the bosses and the base to adapt it for reception of a bolt 18. The bolt is utilized to secure the track shoe to a track link of an endless track assembly (not shown) of a track-type vehicle in a conventional manner. A plurality of access openings 19 are formed through sidewalls 12 and 13 to each overlie a respective bore 17 to provide access to the head of a bolt 18 whereby a workman can readily secure the track shoe to the endless track assembly.

Figure 2:
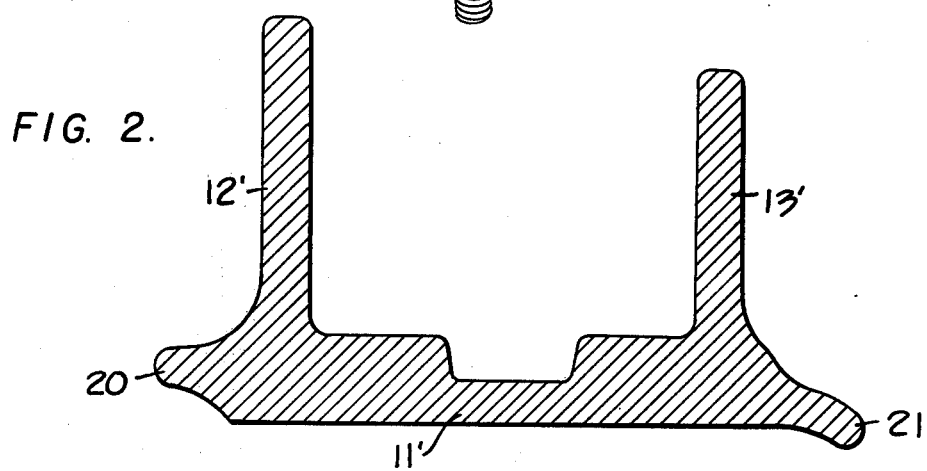
FIG. 2 is a cross sectional view of a blank employed to form the FIG. 1 track shoe.

The method for making the track shoe will now be described. FIG. 2 illustrates a generally U-shaped blank comprising a prefabricated base 11' and upstanding sidewalls 12' and 13', disposed in perpendicular relationship relative to the base. Although the blank is preferably cast in a conventional manner to provide bosses 16, it should be understood that the blank could likewise be roll-formed or extruded in a conventional manner. The blank is further formed with a pair of integral lugs 20 and 21, disposed on opposite sides of base 11'. The lugs of each adjacent pair of track shoes of an endless track assembly will function in a conventional manner to continuously overlap each other during operation thereof.

Figure 3:
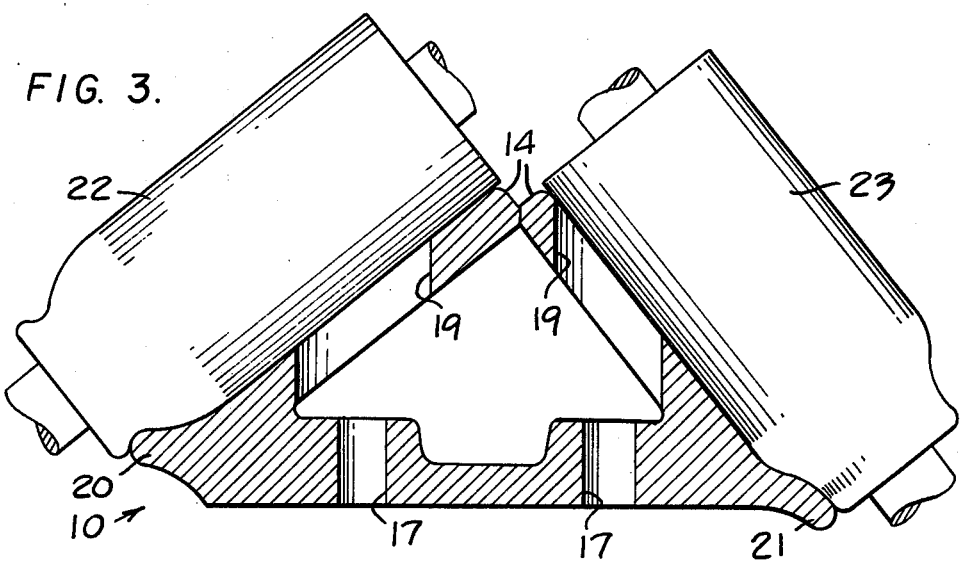
FIG. 3 is a cross sectional view of the track shoe and form rollers employed to bend sidewalls thereof towards each other.

Referring to FIG. 3, a pair of form rollers 22 and 23, suitably movably mounted in a conventional forming apparatus, are adapted to gradually bend and form sidewalls 12' and 15' into their final configuration whereby the track shoe exhibits a triangular cross section. Alternatively, a plurality of such rollers disposed at gradually increased inclinations relative to the line of flight of the track shoe blank could be employed to effect the bending step. Subsequent to such forming operation, it should be understood that bores 17 and access openings 110 may be suitably formed in the blank.

Upon final bending of sidewalls 12 and 17 to their FIG. 3 dispositions to place edges 14 thereof in close proximity, weld 15 (FIG. 1) may be deposited in V-shaped groove 14, defined by such edges, to secure the sidewalls together as suggested above, the weld could be omitted to maintain the sidewalls in unsecured relationship relative to each other. The completed track shoe is thus adapted for securance to the link assembly of an endless track assembly by means of bolts 18 and nuts (not shown) threadably mounted thereon.

The embodiments of the invention in which an exclusive property or privilege is claimed are defined as follows:

1. A track shoe adapted for use in an endless track assembly comprising
    a base,
    a pair of laterally spaced sidewalls formed integrally with said base and extending away therefrom and towards each other in converging relationship to terminate at end portions thereof disposed in close proximity to each other to define a track shoe having a uniform triangular cross section at least substantially throughout the width thereof, and
    a lug formed on each lateral side of said base and extending outwardly therefrom.

2. The track shoe of claim 1 further comprising securing means securing the end portions of said sidewalls together.

3. The track shoe of claim 2 wherein the end portions of said sidewalls terminate at edges defining a V-shaped groove therebetween, said securing means comprising weld means deposited in said groove.

4. The track shoe of claim 3 wherein said weld means constitutes a single weld deposited in said groove and extending at least substantially the full length of said track shoe.

5. The track shoe of claim 1 further comprising means defining a plurality of bores through said base each adapted to receive a bolt therethrough when said track shoe is secured in an endless track assembly of a track-type vehicle.

6. The track shoe of claim 5 further comprising a plurality of bosses formed integrally on an interior surface of said base, a said bore formed through each of said bosses.

7. The track shoe of claim 5 further comprising means defining a plurality of access openings through said sidewalls, each access opening exposing one of said bores.

8. A method for making a track shoe adapted for use in an endless track assembly for a track-type vehicle comprising the steps of forming a blank to have a base and a pair of upstanding and laterally spaced sidewalls, and bending said sidewalls towards each other to place end portions thereof closely adjacent to each other to form a hollow track shoe.

9. The method of claim 8 further comprising the step of securing the end portions of said sidewalls together.

10. The method of claim 9 wherein said securing step comprises welding said sidewalls together.

11. The method of claim 10 wherein said bending step comprises bending said sidewalls to place opposed edges thereof in close proximity to define a V-shaped groove therebetween and wherein said securing step comprises depositing a weld in said groove.

12. The method of claim 8 wherein said bending step comprises bending said sidewall into a V-shape to form a track shoe having a triangular cross section.

13. The method of claim 8 further comprising the step of forming a plurality of bores through said base adapted to receive bolts therethrough when said track shoe is secured in an endless track assembly of a track-type vehicle.

14. The method of claim 13 further comprising the step of forming a plurality of access openings through said sidewalls to each expose a respective one of said bores.

15. The method of claim 13 wherein said forming step comprises further forming a plurality of bosses interiorly on said base and wherein each of said bores is formed through a respective one of said bosses.

16. The method of claim 8 wherein said forming step further comprises forming a pair of lugs on opposite sides of said base to extend outwardly therefrom.

17. A track shoe adapted for use in an endless track assembly comprising a base a pair of laterally spaced sidewalls formed integrally with said base and extending away therefrom and towards each other in converging relationship to terminate at end portions thereof disposed in close proximity to each other to define a track shoe having a uniform triangular cross section at least substantially throughout the width thereof, the end portions of said sidewalls terminating at edges defining a V-shaped groove therebetween, and weld means deposited in said groove for securing the end portions of said sidewalls together.

* * * * *